US011633914B2

(12) United States Patent
Hunt et al.

(10) Patent No.: US 11,633,914 B2
(45) Date of Patent: Apr. 25, 2023

(54) CONFIGURABLE PRINTING BED FOR 3D PRINTING

(71) Applicant: INTERNATIONAL BUSINESS MACHINES CORPORATION, Armonk, NY (US)

(72) Inventors: Hamish C. Hunt, Ashford (GB); Gwilym Benjamin Lee Newton, Winchester (GB); Daniel Thomas Cunnington, Winchester (GB); Elizabeth Jane Maple, Basingstoke (GB)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 168 days.

(21) Appl. No.: 17/072,181

(22) Filed: Oct. 16, 2020

(65) Prior Publication Data

US 2022/0118700 A1 Apr. 21, 2022

(51) Int. Cl.
*B29C 64/245* (2017.01)
*B29C 64/232* (2017.01)
(Continued)

(52) U.S. Cl.
CPC .......... *B29C 64/245* (2017.08); *B29C 64/118* (2017.08); *B29C 64/209* (2017.08);
(Continued)

(58) Field of Classification Search
CPC ... B29C 64/245; B29C 64/118; B29C 64/209; B29C 64/321; B29C 64/393; B29C 64/232
See application file for complete search history.

(56) References Cited

U.S. PATENT DOCUMENTS 9,514,397 B2 12/2016 Peek
9,902,145 B2 2/2018 Chang
(Continued)

FOREIGN PATENT DOCUMENTS

CN 206357636 U 7/2017
WO WO-2017090032 A1 * 6/2017

OTHER PUBLICATIONS

OOTB, "Pin Art Pinpressions," https://www.amazon.co.uk/OOTB-93-2109-Pin-Pinpressions/dp/B000WXXW2S/ref=sr_1_7?keywords=pin+art&qid=1571924848&s=kids&sr=1-7, accessed Jul. 30, 2020, 8 pages.

(Continued)

*Primary Examiner* — Joseph S Del Sole
*Assistant Examiner* — Mohamed K Ahmed Ali
(74) *Attorney, Agent, or Firm* — Caleb D. Wilkes

(57) ABSTRACT

A configurable printing bed for a 3D printer includes a bed surface and linear actuators. The bed surface includes bed surface portions. Each of the bed surface portions is supported for independent movement. When each of the bed surface portions is positioned at the reference level, the bed surface portions form different parts of a common plane. Each of the linear actuators is connected to at least one of the bed surface portions, respectively. The linear actuators are configured to generate the independent movement of the bed surface portions and to effect positioning of the bed surface portions. A 3D printer includes the configurable printing bed, an extruder, a feeding system, and a filament spool. A method for performing 3D printing includes providing the 3D printer and printing an object using the 3D printer.

20 Claims, 7 Drawing Sheets

(51) Int. Cl.
   *B29C 64/118* (2017.01)
   *B29C 64/321* (2017.01)
   *B29C 64/209* (2017.01)
   *B33Y 30/00* (2015.01)

(52) U.S. Cl.
   CPC .......... *B29C 64/232* (2017.08); *B29C 64/321* (2017.08); *B33Y 30/00* (2014.12)

(56) References Cited

U.S. PATENT DOCUMENTS

| | | |
|---|---|---|
| 10,474,134 B2 | 11/2019 | Huang |
| 2016/0361834 A1 | 12/2016 | Chen-Iun-Tai |
| 2017/0087773 A1 | 3/2017 | Choi |
| 2021/0187846 A1* | 6/2021 | Smith, III .............. B29C 64/245 |

OTHER PUBLICATIONS

Baumann et al., "Vision based error detection for 3D printing processes," MATEC Web of Conferences 59, 06003 (2016), DOI: 10.1051/matecconf/20165906003, 7 pages.

Blackbelt 3D BV, "Blackbelt 3D Printer Desktop Version," https://blackbelt-3d.com/blackbelt-3d-printer-desktop-version, accessed Jul. 30, 2020, 4 pages.

Ethereal Machines, "Welcome to Ethereal Machines," https://etherealmachines.com/#/products/halo, accessed Jul. 30, 2020 and Oct. 14, 2020, 8 pages.

Higgs Baptiste, "3D Print Overhangs and How to Deal With Them," Medium, Feb. 21, 2018, https://medium.com/bravovictornovember/3d-print-overhangs-and-how-to-deal-with-them-9eed6a7bcb5d, 8 pages.

Obudho Brian," 3D Printing Overhang: How to 3D Print Overhangs," ALL3DP, May 14, 2019, https://all3dp.com/2/3d-printing-overhang-how-to-master-overhangs-exceeding-45/, 13 pages, downloaded on Oct. 14, 2020.

Tyson Ed, "How to Print Overhangs, Bridges and Exceeding the 45° Rule," https://rigid.ink/blogs/news/how-to-print-overhangs-bridges-and-exceeding-the-45-rule, accessed Jul. 30, 2020, 13 pages.

3D Printing Nerd, "3D Printing With an Unlimited Z!," Apr. 2, 2019, https://www.youtube.com/watch?v=V6SrN2qW1Hw, accessed Oct. 14, 2020, 2 pages.

Ethereal Machines, "Ethereal Halo—The Dawn of Hybrid Manufacturing," https://www.youtube.com/watch?v=4c_7WmSYjMU&feature=youtu.be, accessed Jul. 30, 2020, 1 page.

* cited by examiner

CONFIGURABLE PRINTING BED FOR 3D PRINTING

BACKGROUND

The present invention relates to three-dimensional (3D) printers for printing 3D objects.

SUMMARY

According to one exemplary embodiment, a configurable printing bed for a 3D printer is provided. The configurable printing bed may include a bed surface and linear actuators. The bed surface may include bed surface portions. Each of the bed surface portions may be supported for independent movement. When each of the bed surface portions is positioned at a reference level, the bed surface portions may form different parts of a common plane. Each of the linear actuators may be connected to at least one of the bed surface portions, respectively. The linear actuators may be configured to generate the independent movement of the bed surface portions and to effect positioning of the bed surface portions.

According to another embodiment, a 3D printer may be provided that includes a configurable printing bed as described above.

According to another embodiment, a configurable printing bed for a 3D printer is provided that includes a bed surface and linear actuators. The bed surface includes bed surface portions. Each of the bed surface portions is supported for independent movement and includes a respective head that is twistable. When each of the bed surface portions is positioned at a reference level, the bed surface portions form different parts of a common plane. Each of the linear actuators is connected to at least one of the bed surface portions, respectively. The linear actuators are configured to generate the independent movement of the bed surface portions and to effect positioning of the bed surface portions. The linear actuators are configured to lower the bed surface portions in a staggered manner.

BRIEF DESCRIPTION OF THE DRAWINGS

Embodiment of the present invention will now be described, by way of example only, with reference to accompanying drawings, in which.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

Figure 1:
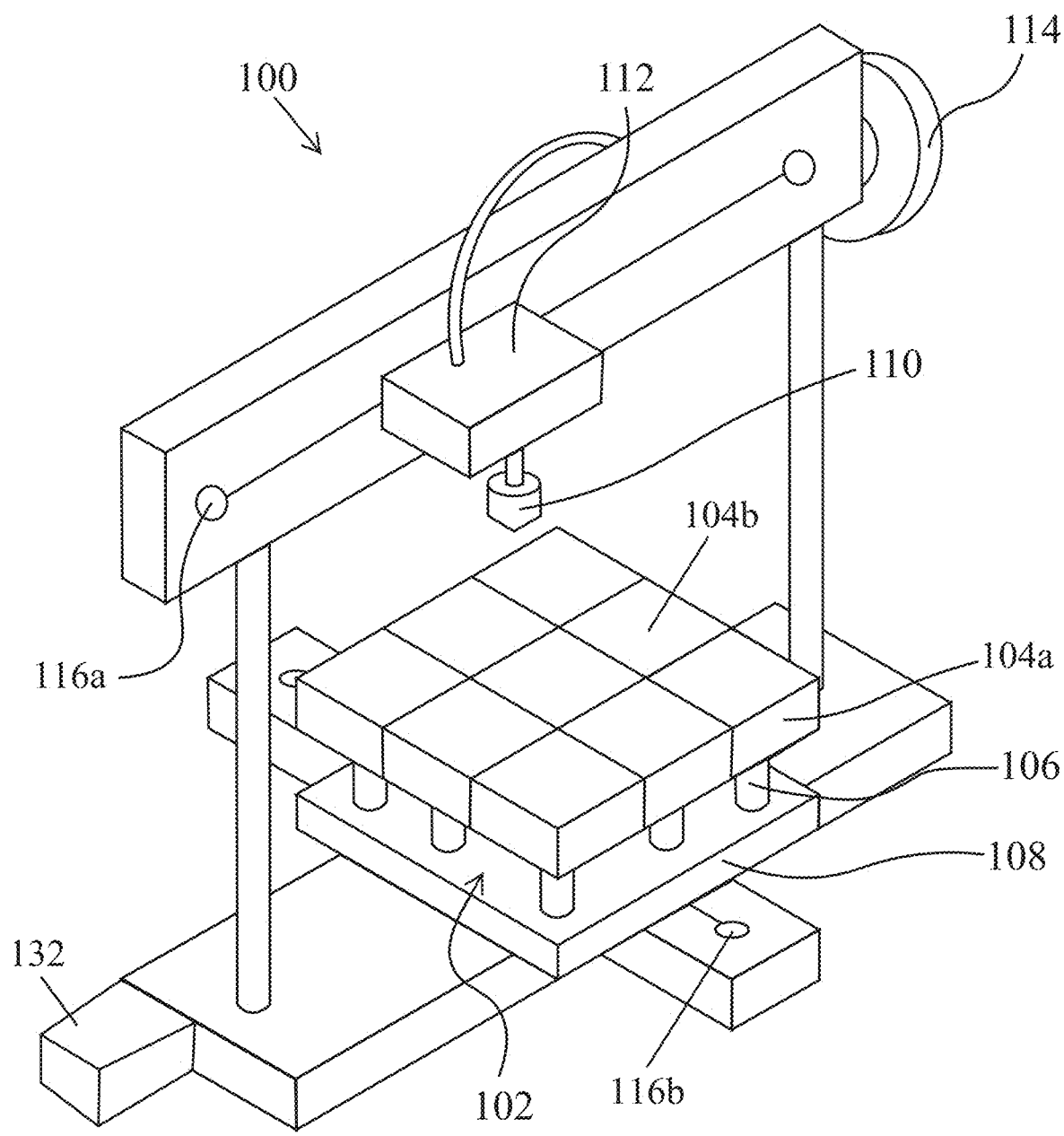
FIG. 1 shows a perspective view of a 3D printer according to an embodiment of the present invention.

FIG. 1 illustrates a particular embodiment of a 3D printer 100 that includes a configurable printing bed 102, an extruder 110, a feeding system 112, a filament spool 114, a first track 116a for allowing horizontal movement of the feeding system 112 and the extruder 110, and a second track 116b for allowing horizontal movement of the bed support member 108 and the configurable printing bed 102. The first track 116a and the second track 116b may be glide tracks and are types of motion components. The second track 116b may be referred to as a bed track. The configurable printing bed 102 includes a bed surface that has a set of bed surface portions. A first bed surface portion 104a and a second bed surface portion 104b are part of the bed surface portions and are labeled in FIG. 1.

3D printing is a fabrication technology which involves the creation of an object by depositing material in a layer-by-layer manner on a printing bed or on a build plate. One type of material extrusion technique is fused deposition modelling (FDM), also known as fused filament fabrication (FFF), where a continuous filament of a thermoplastic or a metal material is deposited onto the printing bed.

The extruder 110 may include a print head and may have a cold end and a hot end. A nozzle may be disposed at the hot end. The feeding system 112 may control how filament material is passed through the extruder 110. The end of the filament material may be inserted into the extruder 110. The rest of the filament material may be loaded into the filament spool 114 which may include a filament spool holder. The configurable printing bed 102 and the feeding system 112 may independently move along, e.g., via movement along one of the second track 116b or the first track 116a, and may be attached to a frame.

Components of the 3D printer 100 may move the extruder 110 and the configurable printing bed 102 to the coordinates corresponding to the required printing position of the build object. While in the correct position, the cold end of the extruder 110 may clamp the end of the filament and may push it down to the hot end, which in turn melts the filament. The melted filament material may be pushed out of the nozzle of the extruder 110 and may be deposited onto the configurable printing bed 102. The components of the 3D printer 100 may continue to move the extruder 110 and the configurable printing bed 102 to successive printing positions as the filament material continues to be deposited on the build object layer-by-layer until the printing has been completed and the build object is fully formed and ready to be separated from the configurable printing bed 102.

The bed surface portions are enabled to achieve independent movement with the help of a set of linear actuators 106. The linear actuators 106 are configured to generate independent movement of the bed surface portions including the first bed surface portion 104a and the second bed surface portion 104b and to effect positioning of the bed surface portions including the first bed surface portion 104a and the second bed surface portion 104b. The independent movement may be relative to a reference level and may be perpendicular to a reference level. The independent movement may additionally or alternatively be within a common plane of the reference level. Each of the linear actuators 106 may be connected to at least one bed surface portion.

The linear actuators 106 may connect the bed surface portions, and thereby the bed surface, to the bed support member 108. The bed support member 108 may support the linear actuators 106 and, therefore, may support the bed surface and may support the bed surface portions such as the first bed surface portion 104a and the second bed surface portion 104b. When each of the bed surface portions is positioned at the reference level, the bed surface portions may form a common plane, e.g., a smooth common plane, as is shown in FIG. 1.

The filament spool 114 may provide a filament of a polyactic acid (PLA) material, an acrylonitrile butadiene styrene (ABS) material, or another material suitable for 3D printing such as a metal material or a thermoplastic material. The filament is fed to the feeding system 112 and to the extruder 110 for printing the object on the bed surface.

The bed surface portions shown in the embodiment of FIG. 1 such as the first bed surface portion 104a and the second bed surface portion 104b interlock together when they are all positioned at the reference level, e.g. the bed surface portions fit snugly next to each other, e.g., are tessellated with respect to each other. In this embodiment, when these bed surface portions interlock with each other and are positioned at the reference level they form a smooth common plane. In the embodiment shown in FIG. 1, the bed surface portions and the bed surface from a continuous printing surface in the common plane. In the embodiment shown in FIG. 1, the bed surface portions including the first bed surface portion 104a and the second bed surface portion 104b have the same shape and size as each of the other bed surface portions.

Figure 3A:
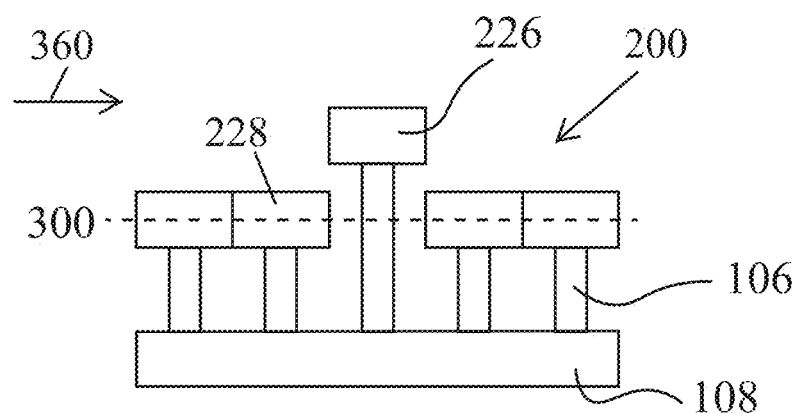
FIG. 3A shows a cross sectional view of the printing bed of FIG. 2A in an actuated position forming a stepped surface.

When the linear actuators 106 raise or lower the interlocking surface portions such as the first bed surface portion 104a and the second bed surface portion 104b relative to the reference level, they can be configured to provide a variety of stepped surfaces on which the object to be printed is supported. FIG. 3A shows an example of a portion of the bed surface having been moved to form a stepped surface.

Figure 2E:
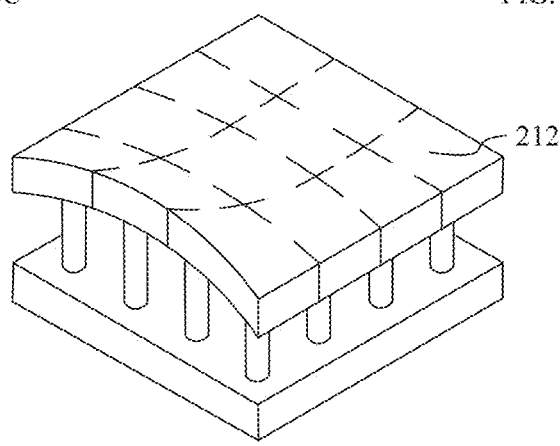
FIG. 2E shows a perspective view of another configurable bed surface that may be used in the 3D printer of FIG. 1.
Figure 3B:
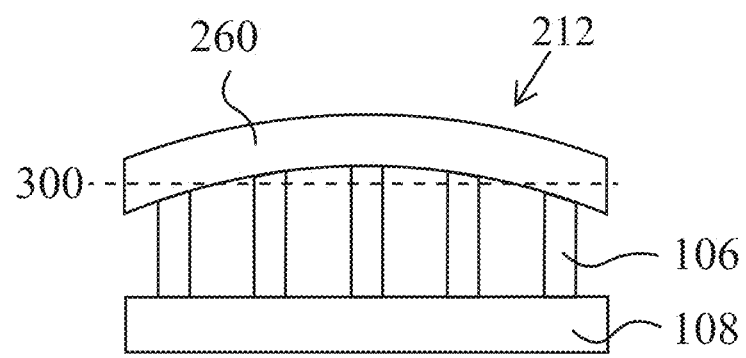
FIG. 3B shows a cross sectional view of the printing bed of FIG. 2E in an actuated position forming a smoothly angled incline in the surface of the printing bed.

The 3D printer 100 of FIG. 1 is arranged to print a build object by having the extruder 110 push out the printing ink or the printing resin onto the configurable printing bed 102. Motion components such as the first track 116a and the second track 116b may help move the configurable printing bed 102 and the feeding system 112, respectively, into a correct position, e.g., as indicated by a 3D printing software program for printing/producing a particular object. The 3D printing software program may be saved in a memory of the control box 132. In conjunction, the set of linear actuators 106 may move their corresponding bed surface portions such as the first and second bed surface portions 104a, 104b to the required position, e.g., to a position above or below the reference level, e.g., in a direction perpendicular to the reference level. Some or all of the bed surface portions may be raised or lowered relatively to other bed surface portions. FIGS. 2E, 3A, and 3B show instances in which some bed surface portions have been raised relative to other bed surface portions and relative to a reference level of a common plane.

In one printing job that may be performed with the configurable printing bed 102, the set of linear actuators 106 may not be activated or actuated. Because of this lack of activation or lack of actuation, the bed surface portions are all positioned at the reference level, forming a common plane as is shown in FIG. 1.

Alternatively, the set of linear actuators 106 may be actuated to return the configurable printing bed 102 from a previous printing position back into a level position with the various bed surface portions forming a common plane. Thus, the resulting position is the same as described above when no actuation occurred, but with this embodiment actuation of the linear actuators 106 was necessary to achieve the position.

When the feeding system 112, the configurable printing bed 102, and the bed surface portions including the first and second bed surface portions 104a, 104b are all in the correct position, the extruder 110 deposits the melted filament material onto the bed surface portions, e.g. onto the first and second bed surface portions 104a, 104b. The feeding system 112 feeds filament from the filament spool 114 to the extruder 110. The extruder 110 may include one or more nozzles configured to emit or extrude the melted filament material in a controlled manner. The feeding system 112 may include a rigid pipe or a flexible pipe or passageway through which the filament from the filament spool 114 is passed. The feeding system 112 may also receive the filament in an opening and may have a pulling mechanism to pull the filament from the filament spool 114.

In an embodiment, the set of actuators 106 are communicatively related to better move corresponding bed surface portions into a proper position to support an object to be printed. A control box 132 that includes hardware of at least one memory and at least one processor may control the actuation of the actuators to move the various bed surface portions into an appropriate position for receiving melted filament for shaping a layer of the build object. In the embodiment shown in FIG. 1, the control box 132 is adjacent the bed support member 108. The control box 132 may have wireless communication with the set of actuators 106 or may have a wired connection to communicate with the set of actuators 106. In alternative embodiments, a remote control box may be used that uses wireless communication with the actuators 106 to control their actuation movements. 3D printing software may be stored in the at least one memory and may be executed by the one or more processors to cause appropriate movement of the movable components of the 3D printer 100 for printing/producing a particular object.

The actuators 106 may include hydraulic, pneumatic, or and/or thermal magnetic systems as components of their power mechanisms and arrangements.

As the bed surface portions form part of the bed surface, these bed surface portions may be disposed at an outward-facing position where they can receive melted filament material from the extruder 110. Even in a stepped surface arrangement, the bed surface portions in a lower portion of the step may be disposed to at an outward-facing position where they can receive melted filament material from the extruder 110.

FIGS. 2A-2F illustrate examples of how the bed surface portions, which form the bed surface, may be arranged to be used by the 3D printer 100 of FIG. 1. When each of the bed surface portions are positioned at the reference level, they may form a common plane as is shown in the configuration of the embodiments of FIGS. 2A-2D and 2F. The embodiment shown in FIG. 2E has actuators that are also capable of moving all bed surface portions into a common plane in the reference level; however, the viewpoint shown in FIG. 2E is at an instance when some bed portions have been moved out of the reference level so that not all of the bed surface portion is in a common plane.

Figure 2A:
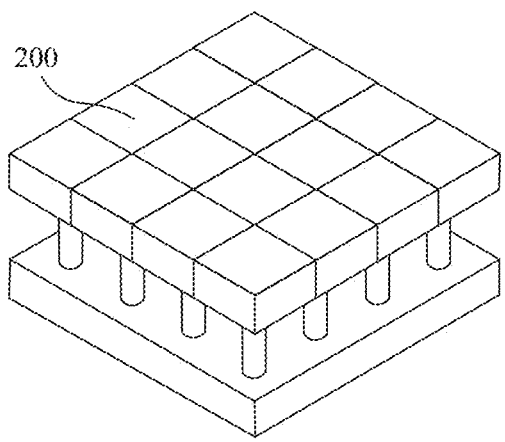
FIG. 2A shows a perspective view of a configurable bed surface that may be used in the 3D printer of FIG. 1.

The embodiment shown in FIG. 2A has a bed surface that includes quadrilateral portions 200 of the same shape and size, e.g., of identical shape and size. The quadrilateral portions 200 may, for example, be squares or rectangles. When the actuators are engaged for this embodiment, the bed surface can be moved to provide a variety of stepped surfaces to support the build object that is to be formed. FIG. 3A described below shows a cross sectional view of the embodiment of FIG. 2A and shows an instance in which portions of the bed surface has been moved to form a stepped surface. FIG. 2A shows a view of an instance when the quadrilateral portions 200 interlock each other in a tessellated manner and are at the reference level and when upper surfaces of the quadrilateral portions 200 thereby form a common plane.

Figure 2B:
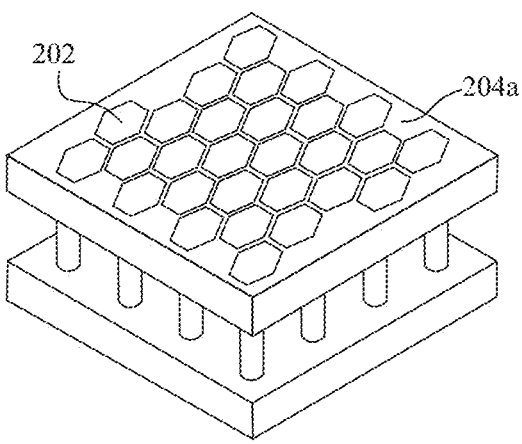
FIG. 2B shows a perspective view of another configurable bed surface that may be used in the 3D printer of FIG. 1.

The embodiment shown in FIG. 2B has a bed surface that includes hexagonal portions 202 of the same shape and size, e.g., of identical shape and size. The hexagonal portions 202 are interlocked between parts of a first perimeter bed surface portion 204a which may itself be supported by a set of linear actuators or by a single actuator. The first perimeter bed surface portion 204a may be a single unitary piece. The first perimeter bed surface portion 204a may form a frame around all of the hexagonal portions 202 and may form a plurality of individual frames which surround individually the hexagonal portions 202 when the hexagonal portions 202 are at the reference level or may surround an extension pole of the hexagonal portions 202 when the hexagonal portions have been pushed above the reference level. The hexagonal portions 202 at the reference level as shown in the configuration of FIG. 2B form a common plane together with the first perimeter bed surface portion 204a. The frames that the first perimeter bed surface portion 204a forms around individual ones of the hexagonal portions 202 may partially or completely surround the individual ones of the hexagonal portions 202. In this embodiment, the hexagonal portions 202 may be considered to be tessellated with respect to the first perimeter bed surface portion 204a and form a common plane with the first perimeter bed surface portion 204a when all portions are in the reference level. In an alternative embodiment, other hexagonal portions could be tessellated with respect to each other without an additional perimeter bed surface portion such as the first perimeter bed surface portion 204a.

Figure 2C:
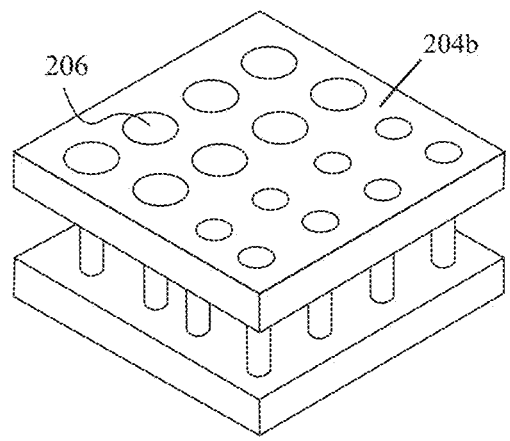
FIG. 2C shows a perspective view of another configurable bed surface that may be used in the 3D printer of FIG. 1.

The embodiment shown in FIG. 2C has a bed surface that includes elliptical portions 206 of varying sizes. The elliptical portions 206 in this embodiment may be circles, but other embodiment may include ovals as an alternative example of elliptical portions. Some embodiments may include a mixture of ovals and circles as elliptical portions 206. In the embodiment of FIG. 2C, the elliptical portions 206 are interlocked between a second perimeter bed surface portion 204b which may itself be supported by a set of linear actuators or by a single actuator. The second perimeter bed surface portion 204b may form a frame around all of the elliptical portions 206 and may form a plurality of individual frames which surround individually the elliptical portions 206 when the elliptical portions 206 are at the reference level or when the vertical position of the elliptical portions 206 are raised may surround a portion of an extension pole to which the elliptical portions 206 are attached. The elliptical portions 206 at the reference level may form a common plane together with the second perimeter bed surface portion 204b as is shown in the configuration position of FIG. 2C. The frames that the second perimeter bed surface portion 204b forms around individual ones of the elliptical portions 206 may partially or completely surround the individual ones of the elliptical portions 206. The elliptical portions 206 in this embodiment shown in FIG. 2C have one of two sizes, although in other embodiments various bed surface portions in a single bed surface may have a greater variety of sizes. In this embodiment, the elliptical portions 206 may be considered to be tessellated with respect to the second perimeter bed surface portion 204b and form a common plane with the second perimeter bed surface portion 204b when all portions are in the reference level.

Figure 2D:
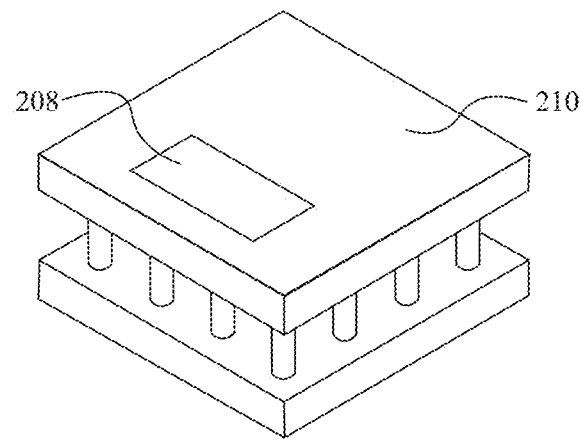
FIG. 2D shows a perspective view of another configurable bed surface that may be used in the 3D printer of FIG. 1.

The embodiment shown in FIG. 2D includes a bed surface made up of two, non-identical, interlocking bed surface portions which include a first non-identical portion 208 and a second non-identical portion 210. FIG. 2D shows a view of an instance in which the first and second non-identical portions 208, 210 are both at the reference level and form a common plane. In this configuration position shown in FIG. 2D, the first and second non-identical portions 208, 210 interlock with each other in a tessellated manner at the reference level to form a common plane. The second non-identical portion 210 forms a perimeter frame around the first non-identical portion 208. If the linear actuators 106 for effecting of the position of the first non-identical portion 208 actuate to move these linear actuators 106 upwards, e.g., to move one or more extension poles of the linear actuators 106 upwards, this embodiment may form a stepped surface with the first non-identical portion 208 being disposed above the second non-identical portion 210. Alternatively, if the linear actuators 106 for effecting the positioning of the second non-identical portion 210 actuate to move these linear actuators 106 upwards, e.g., to move one or more extension poles of these linear actuators 106 upwards, this embodiment may form a stepped surface with the second non-identical portion 210 being disposed above the first non-identical portion 208. In this embodiment, the second non-identical portion 210 may be considered to be tessellated with respect to the first non-identical portion 208 and form a common plane with the first non-identical portion 208 when both portions are in the reference level.

The bed surface portions such as the first or second bed surface portions 104a, 104b, the quadrilateral portions 200, the hexagonal portions, 202, the elliptical portions 206, the first perimeter bed support portion 204a, the second perimeter bed support portion 204b, the first non-identical portion 208, and the second non-identical portion 210 may be formed from a ceramic glass material, a tempered glass material, a borosilicate glass material, a mirror tile glass material, a plastic material, a polyetherimide (PEI) material, a polyetheretherketone (PEEK) material, a spring steel material, a magnetic material, a polypropylene material, a polymer material, a ceramic material, a metal material, or another material with some rigidity. The material may have a coating such as a microporous inorganic coating or an adhesive coating such as hairspray or glue, e.g., glue from a glue stick.

The embodiment shown in FIG. 2E has a flexible bed surface 212 that is made from a unitary flexible material, so that all individual bed surface portions are integrally connected to each other and form a one-piece bed surface. The flexible bed surface 212 is not formed from individual pieces that interlock with each other, but rather the flexible bed surface 212 forms a continuous printing surface via the unitary flexible material. The integral bed surface portions of the flexible bed surface 212 are still supported by a set of linear actuators 106. When at least one linear actuator raises a particular bed surface portion of the flexible bed surface 212 while other linear actuators do not actuate, the flexible bed surface 212 may form one or more smoothly angled inclines 260 (see FIG. 3B) in the bed surface and in the upper surface as the particular bed surface portion is raised above the other bed surface portions. A build object may be printed onto the upper surface. With this arrangement, the printing bed can be configured to provide a continuous, angled incline in the printing surface to support the build object. This embodiment may be helpful to form smoothly angled surfaces, e.g. smoothly angled exterior surfaces, in the build object. The continuous printing surface may have zero openings or zero through-passages within it that extend from a bottom surface to a top surface of the bed material. In some embodiments, the continuous printing surface may have zero cavities within it that extend a partial distance into the flexible bed surface 212.

Figure 2F:
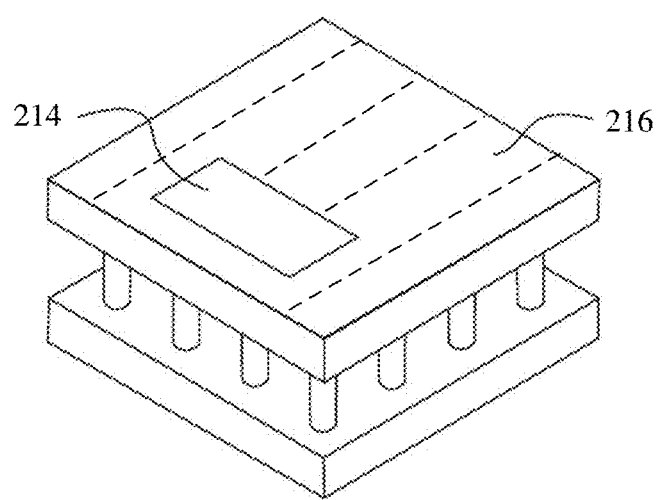
FIG. 2F shows a perspective view of another configurable bed surface that may be used in the 3D printer of FIG. 1.

The embodiment shown in FIG. 2F has a bed surface that includes a flexible partial bed surface 216 that is made from a unitary flexible material. The flexible partial bed surface 216 is not formed from individual pieces that interlock with each other, but rather the flexible partial bed surface 216 forms a continuous printing surface via the unitary flexible material and over a portion of the entire bed surface. The bed surface of this embodiment also includes a second portion 214. When the flexible partial bed surface 216 and the second portion 214 are both at the reference level, e.g., when neither of these two components have been actuated by an actuator 106 and when their vertical positions have not been adjusted, the second portion 214 interlocks with or tessellates together with the flexible partial bed surface 216 at the reference level to form a common plane. The flexible partial bed surface 216 may form a perimeter that surrounds, e.g. completely surrounds, the second portion 214.

With this embodiment shown in FIG. 2F, the flexible partial bed surface 216 may be actuated by actuators to form a smoothly angled incline within the region of the flexible partial bed surface 216, e.g., a smoothly angled incline similar to those shown in FIG. 2E or 3B. This embodiment of FIG. 2F may additionally include a stepped surface being formed between the second portion 214 and the flexible partial bed surface 216, when one is raised above the other. For example, if the second portion 214 is actuated upwards but the flexible partial bed surface 216 is not actuated upwards, a stepped surface may be formed with the second portion 214 being disposed above the flexible partial bed surface 216. Alternatively, if the flexible partial bed surface 216 is actuated upwards but the second portion 214 is not actuated upwards, a stepped surface may be formed with the flexible partial bed surface 216 being disposed above the second portion 214. The second portion 214 itself may be formed of another flexible unitary material or of a rigid material. If the second portion 214 is formed of another flexible unitary material, the second portion 214 may form a smoothly angled incline internal to itself if actuated but would then usually still not be unitary with the flexible partial bed surface 216.

For the flexible bed surface 212 or for the flexible partial bed surface 216, the unitary flexible material may be a spring steel material, a polyethyelene material such as a high-density polyethylene material, a polysiloxane (silicone) material, a beryllium copper material, a polyaramid fiber material, a glass fiber material, a carbon fiber material, a rubber leather material, a synthetic elastomer material, or some other material which is flexible to allow bending without rupture or breakage or permanent deformation but has some strength to support an object to be printed.

FIGS. 3A and 3B are cross sectional views of embodiments of a printing bed that is suitable for use in the 3D printer 100 shown in FIG. 1.

FIG. 3A is a cross-sectional view of the bed surface portion arrangement that is shown in FIG. 2A but after the bed surface portion arrangement has had a linear actuator 106 actuate to adjust a vertical position of a bed surface portion so that a stepped surface is formed. Each linear actuator 106 corresponds to and is connected to a bed surface portion 200 such that when the linear actuator 106 actuates, the linear actuator 106 raises the corresponding bed surface portion above or below the reference level 300. When the bed surface portions are positioned at the reference level, they form a common plane as is shown in FIG. 2A. In the view shown in FIG. 3A, a stepped surface has been formed between a central bed surface portion 226 and an adjacent bed surface portion 228. The central bed surface portion 226 is disposed adjacent to the adjacent bed surface portion 228 in the horizontal direction 360. In the printing configuration position shown in FIG. 3A, the central bed surface portion 226 is positioned higher than the adjacent bed surface portion 228. The vertical position of the central bed surface portion 226 has been adjusted. In the configuration shown in FIG. 3A portions of the bed surface may form a common plane, but when all portions are considered a stepped surface is present instead of an overall common plane.

FIG. 3B is a cross-sectional view of the example bed surface arrangement that has a unitary flexible material as all or part of the printing bed surface, e.g. the embodiment shown in FIG. 2E. Portions of the flexible bed surface 212 move in accordance to the raising and lowering of the set of linear actuators 106 that support the flexible bed surface 212. The bed surface portions move relative to the reference level, e.g., move above or below the reference level 300. When at least one linear actuator 106 raises a particular bed surface portion of the flexible bed surface 212 while other linear actuators do not actuate or do not actuate the same amount, the flexible bed surface 212 may form one or more smoothly angled inclines 260 in the upper surface as some bed surface portions are raised above other bed surface portions, e.g., are adjusted to a vertical position higher than the vertical positions of other bed surface portions. In the printing configuration shown in FIG. 3B, central portions of the flexible bed surface 212 are positioned higher than some peripheral portions of the flexible bed surface 212, but the bed surface still maintains a continuous printing surface. The features shown in FIG. 3B may also apply to the flexible partial bed surface 216 shown in FIG. 2F.

Figure 4A:
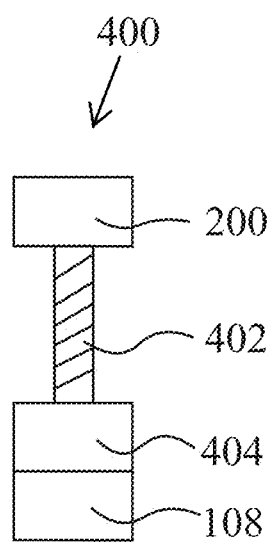
FIG. 4A shows a side view of an embodiment of a linear actuator for the 3D printer of FIG. 1.
Figure 4B:
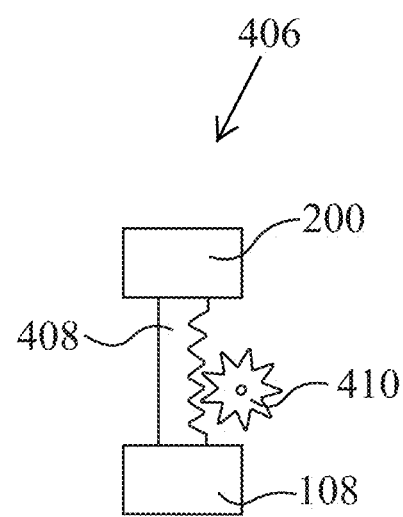
FIG. 4B shows a side view of another embodiment of a linear actuator for the 3D printer of FIG. 1.

FIGS. 4A and 4B illustrate examples of linear actuators that may be used by the 3D printer 100 of FIG. 1, e.g. for the bed surface arrangement that is described in the embodiment of FIG. 2A. FIG. 4A illustrates an example of a mechanical traveling nut linear actuator 400. This mechanical traveling nut linear actuator 400 includes a ball screw 402 to support the bed surface portion 200. The ball screw 402 is controlled by a traveling nut electric motor 404. When the traveling nut electric motor 404 is in operation, the traveling nut electric motor 404 may thread the ball screw 402 up and down. This threading of the ball screw 402 in turn may move the bed surface portion 200 above or below the reference level, e.g., in a perpendicular direction with respect to the reference level.

FIG. 4B illustrates an example of a mechanical rack linear actuator 406. In this actuator embodiment, the bed surface portion 200 is supported by and is attached to a vertical rack member 408. The vertical rack member 408 may be meshed with a pinion gear 410. The pinion gear 410 may be controlled by an electric motor. When the electric motor is in operation, this electric motor rotates the pinion gear 410. The rotation of the pinion gear 410 threads the vertical rack member 408 up or down, and, therefore, moves the bed surface portion 200 above or below the reference level, e.g., in a perpendicular direction with respect to the reference level.

Figure 5:
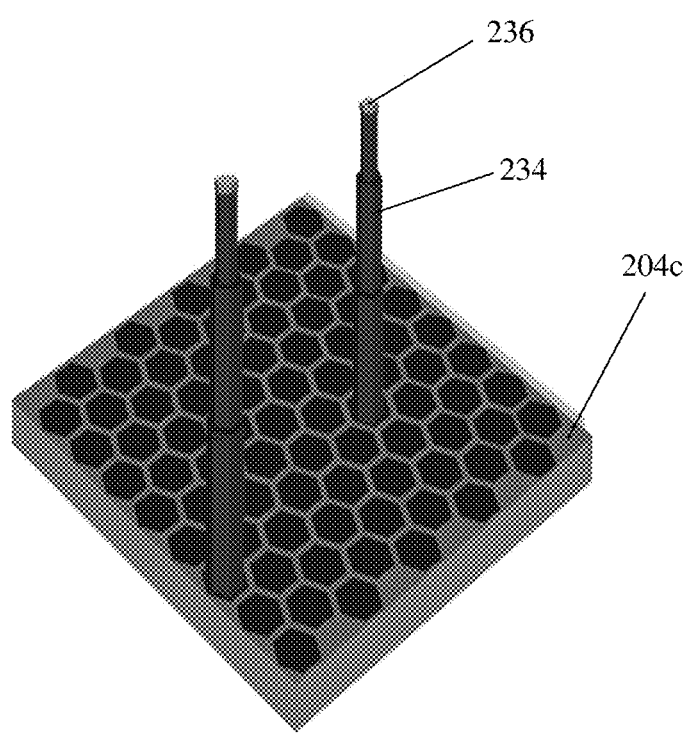
FIG. 5 shows a perspective view of an embodiment with a telescopic pole for actuation.

FIG. 5 shows a view of a portion of an embodiment of a further configurable printing bed. This further configurable printing bed includes a third perimeter bed surface portion 204c, a telescopic pole 234, and a pole head 236a disposed at the end of the telescopic pole 234. The third perimeter bed surface portion 204c includes individual frame portions around hexagonal openings. The hexagonal openings are shown as having an identical size and shape. The telescopic pole 234 has a hexagonal shape and fits snugly in a tessellated manner within one of the hexagonal openings. In this embodiment, two telescopic poles 234 are shown for simplicity; in practice for this embodiment, usually each hexagonal opening would be filled by a telescopic pole 234. The third perimeter bed surface portion 204c may itself be supported by a set of linear actuators or by a single actuator. The third perimeter bed surface portion 204c may be a single unitary piece. The third perimeter bed surface portion 204c may form a frame around all of the hexagonal openings and may form a plurality of individual frames which surround individually the hexagonal openings. An individual frame of the third perimeter bed surface portion 204c would surround the pole head 236a of each telescopic pole 234, respectively, when the telescopic pole 234 is not extended. When the telescopic pole 234 is not extended, the pole head 236 would be disposed at the reference level. When no telescopic pole 234 is extended, ends of the telescopic pole 234 including the pole head 236a form a common plane together with the third perimeter bed surface portion 204c. Thus, the embodiment of which a portion is shown in FIG. 5 is similar to the embodiment shown in FIG. 2B.

The telescopic pole 234 of this embodiment may be retracted or pushed up by a linear actuator 106. For this embodiment in which poles used for retracting or pushing bed portions are telescopic poles 234, space savings underneath the bed may be achieved. In other embodiments, the poles may have a fixed size and may, via a linear actuator 106 that includes a motor, be pushed up or retracted through the bed.

The telescopic pole 234 is shown as having three telescopic sections. Whether one, two, or all three of the telescopic sections would be actuated and extended depends on the required printing position as controlled by the 3D printing program saved in a memory and executed by a processor which sends signals to the linear actuators 106, with extension distance depending on the orientation requirements of the current printing position of the object to be printed.

The pole head 236a may be formed from a rigid material that is capable of supporting a print job and that also allows the printed object to be removed without damaging the printed object. For example, the pole head 236a may be formed from a ceramic glass material, a tempered glass material, a borosilicate glass material, a mirror tile glass material, a plastic material, a polyetherimide (PEI) material, a polyetheretherketone (PEEK) material, a spring steel material, a magnetic material, a polypropylene material, or another material with some rigidity. The material may have a coating such as a microporous inorganic coating or an adhesive coating such as hairspray or glue, e.g., glue from a glue stick.

In one embodiment, the pole head 236a may have a side-to-side length within a range of 8.0 to 10.0 mm. In other embodiments, the pole head 236a may have a smaller or larger side-to-side length. A maximum width of the telescopic pole 234 may match a width of the hexagonal openings in the third perimeter bed surface portion 204c. For other embodiments, a maximum width of an extension pole may match a width of an opening in a bed surface.

In at least some embodiments, the first bed surface portion 104a, the hexagonal portion 202, or the elliptical portion 206 may have a diameter or a side-to-side length within a range of 8.0 to 10.0 mm. In other embodiments, the first bed surface portion 104a, the hexagonal portion 202, or the elliptical portion 206 may have a smaller or larger diameter or side-to-side length than is found within the range provided above. For the hexagonal portion 202 and the elliptical portion 206, a maximum width of these portions may match a width of openings in the bed, e.g., a width of openings in the first perimeter bed surface portion 204a or in the second perimeter bed surface portion 204b. A maximum width of an extension pole connected to the hexagonal portion 202 or to the elliptical portion 206 may match a width of an opening in a bed surface.

In at least some embodiments, the first bed surface portion 104a, the second bed surface portion 104b, the first perimeter bed surface portion 204a, the second perimeter bed surface portion 204b, the third perimeter bed surface portion 204c, the hexagonal portion 202, or the elliptical portion 206 may have a depth in the vertical direction within a range of twenty centimeters to thirty centimeters. In other embodiments, these elements may have a smaller or larger depth than the range that is provided above. For the portions with a telescopic extension pole, e.g., telescopic pole 234, the telescopic extension pole in a flattened, e.g., in a non-extended, state may be less than or at most equal to the depth of bed portions. Therefore, space savings would be achieved because the telescopic extension pole would not extend below the plane of the print bed, although the telescopic extension pole may be connected to an actuator, e.g. a linear actuator 106, that extends below the plane of the print bed.

Figure 6:
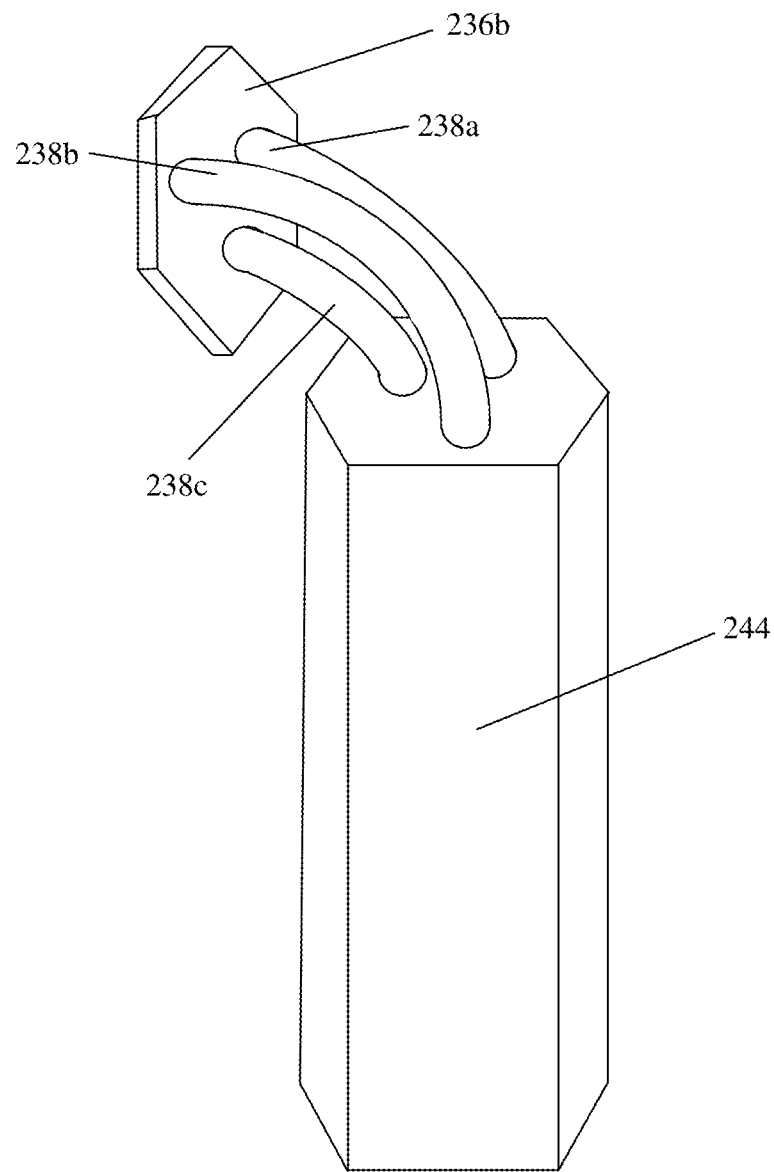
FIG. 6 shows a perspective view of a wired connection of a pole head that is connected to a pole, with the pole head being removed from the pole in order for the wires of the wire connection to be visible.

FIG. 6 shows a view of an embodiment in which first, second, and third wires 238a, 283b, 238c provide a wired connection between a wired pole head 236b and an extension pole 244. In order for the first, second, and third wires 238a, 238b, 238c to be visible, the view in FIG. 6 shows the wired pole head 236b detached or removed from the extension pole 244. In operation, the wires would help hold the wired pole head 236b firmly against the top of the extension pole 244. FIG. 6 shows the extension pole 244 as having a hexagonal cross section; however, in other embodiments a pole may have a circular cross section or a cross section of another shape such as a quadrilateral. Other embodiments may also include more or less wires connecting a bed surface pole head to a pole. For example, other embodiments may have two, four, five, or six wires connecting a bed surface pole head to a pole. Other embodiments may have more than six wires connecting a bed surface pole head to a pole. The wires, e.g., the first, second, and third wires 238a, 238b, 238c, may run down through hollow portions in the pole, e.g., in the extension pole 244, to connect to a portion of the actuators 106. The portion of the actuators 106 may twist the wires which would cause a twisting and/or a tilting of the wired pole head 236b. The first, second, and third wires 238a, 238b, 238c are shown as being disposed equally distant from each other, e.g., at a distance of 180 degrees from the other around a circumference of the path of the wires.

The twisting of the wired pole head 236 achieves a small rotation of the wired pole head 236b which would be helpful for removing a printed object from off of the configurable printing bed 102 after completion of printing of the object. The wired pole head 236b may form part of the printing bed, e.g., part of the configurable printing bed 102. The twisting would help the printed object to become unstuck from the printing bed at the wired pole head 236b.

In one aspect of the disclosure, a method for performing 3D printing includes steps of providing a 3D printing apparatus, e.g., the 3D printer 100, as described herein and printing an object using the 3D printing apparatus. A bed track, e.g., the second track 116b, connected to the printing bed, e.g., the configurable printing bed 102, may be used to adjust a position of the printing bed. A filament from a spool, e.g., from the filament spool 114, may be fed through components, e.g., through the feeding system 112, and through an emitting component, e.g., through the extruder 110, to print the object on a print bed, e.g., on the configurable printing bed 102. Before the printing of the object, a first linear actuator of the linear actuators 106 may adjust a vertical position of a portion of the bed surface portions, e.g., may adjust a position of the central bed surface portion 226, of the adjacent bed surface portion 228, of the first bed surface portion 104a, or of the second bed surface portion 104b.

After the printing of the object, a head, e.g., the wired pole head 236b, of a first bed surface portion of the first bed surface portions may be twisted. A first linear actuator of the linear actuators may lower a bed surface portion, e.g., may lower a first bed surface portion. The printed object may be removed from the first bed surface portion and from the printing bed.

After the printing of the object, multiple pole heads of the bed surface portions may be twisted. Actuators, e.g., linear actuators 106, may lower the bed surface portions in a staggered manner. The printed object may be removed from the bed surface, e.g., from the bed surface portions, e.g., from the first bed surface portion 104a or from the wired pole head 236b. The lowering of the bed surface portions in a staggered manner along with the twisting of the pole heads may generate a release wave for releasing the printed object from the configurable printing bed. Some percentage of the pole heads may be twisted to help with the unsticking of the printed object from the print bed. The twisting and staggered lowering helps reduce the contact area between the print bed and the printed object, which helps reduce force needed to remove the printed object. 3D printing software saved in a memory of a control box may include instructions cause actuators to limit the twisting distance of the wires, in order to avoid entanglement of the wires.

In addition to unsticking, the twisting motion of the pole heads in combination with extension of poles may help tilt the entire print bed up to a certain degree of rotation. This tilting helps so that complex suspended structures may be print via the 3D printer. This tilting would effectively align the main body of the print vertically, so that the printed object may be supported under the force of gravity.

Embodiments of the present disclosure may help reduce the amount of filament material that will be wasted during 3D printing, may help reduce the required amount of printing time for printing an object, and may help achieve improved printing of complex structures. Embodiments of the present disclosure which have the versatile configurable printing bed may help eliminate a need for printing support structures when a build object includes overhanging features. Such printed support structures are often discarded as not being part of the final printed object, and these support structures constitute wasted printing material. Embodiments of the present disclosure may help increase the quality of surfaces of the build object, because removal points of where the printed object would be connected to a printed support structure are not needed. Embodiments of the present disclosure may help increase the possible level of complexity and quality of build objects that are able to be printed and may improve efficiencies of 3D printing processes. Embodiments of the present disclosure may allow build objects that include overhangs to be printed in an improved manner.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises," "comprising," "includes," "including," "has," "have," "having," "with," and the like, when used in this specification, specify the presence of stated features, integers, steps, operations, elements, and/or components, but does not preclude the presence or addition of one or more other features, integers, steps, operations, elements, components, and/or groups thereof.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A configurable printing bed for a 3D printer, the configurable printing bed comprising:
   a bed surface comprising bed surface portions, wherein each of the bed surface portions is supported for independent movement, wherein, when each of the bed surface portions is positioned at a reference level, the bed surface portions form different parts of a common plane; and
   linear actuators, wherein each of the linear actuators is connected to at least one of the bed surface portions, respectively, and wherein the linear actuators are configured to generate the independent movement of the bed surface portions and to effect positioning of the bed surface portions;

wherein a flexible bed surface portion of the bed surface portions is made from a unitary flexible material such that the flexible bed surface portion is a continuous printing surface when a first portion of the flexible bed surface portion is positioned higher than a second portion of the flexible bed surface portion; and wherein multiple linear actuators of the linear actuators are connected to the flexible bed surface portion, and the multiple linear actuators are configured to actuate to different height levels so as to cause the continuous printing surface to comprise a smoothly angled incline.

2. The configurable printing bed of claim 1, wherein each of the bed surface portions has the same shape and size.

3. The configurable printing bed of claim 1, wherein the bed surface portions have non-identical shapes and sizes.

4. The configurable printing bed of claim 1, wherein the flexible bed surface portion and another bed surface portion are arranged to tessellate together to form the common plane.

5. The configurable printing bed of claim 4, wherein the flexible bed surface portion and the other bed surface portion in the common plane form a continuous printing surface.

6. The configurable printing bed of claim 1, wherein the independent movement is in a direction relative to the reference level.

7. The configurable printing bed of claim 6, wherein the direction is perpendicular to the reference level.

8. The configurable printing bed of claim 1, wherein the bed surface comprises a stepped surface when another bed surface portion of the bed surface portions is positioned higher or lower than the flexible bed surface portion.

9. The configurable printing bed of claim 8, wherein the other bed surface portion is disposed adjacent to the flexible bed surface portion along a horizontal direction of the bed surface.

10. The configurable printing bed of claim 1, further comprising a bed support member, wherein the bed support member supports the linear actuators.

11. A 3D printer comprising:
a configurable printing bed comprising:
  a bed surface comprising bed surface portions, wherein each of the bed surface portions is supported for independent movement, wherein, when each of the bed surface portions is positioned at a reference level, the bed surface portions form different parts of a common plane, wherein a flexible bed surface portion of the bed surface portions is made from a unitary flexible material such that the flexible bed surface portion is a continuous printing surface when a first portion of the flexible bed surface portion is positioned higher than a second portion of the flexible bed surface portion; and
  linear actuators, wherein each of the linear actuators is connected to at least one of the bed surface portions, respectively, and wherein the linear actuators are configured to generate the independent movement of the bed surface portions and to effect positioning of the bed surface portions, wherein multiple linear actuators of the linear actuators are connected to the flexible bed surface portion, and the multiple linear actuators are configured to actuate to different height levels so as to cause the continuous printing surface to form a smoothly angled incline for a portion of the bed surface;
an extruder;
a feeding system; and
a filament spool;
wherein the feeding system is configured to feed filament from the filament spool to the extruder; and
wherein the extruder is configured to extrude the filament to the configurable printing bed.

12. The 3D printer of claim 11, further comprising a first track; wherein the extruder is connected to the first track.

13. The 3D printer of claim 11, further comprising a bed track; wherein the configurable printing bed is connected to the bed track.

14. The 3D printer of claim 11, wherein the flexible bed surface portion and another bed surface portion are arranged to tessellate together to form the common plane.

15. The 3D printer of claim 14, wherein the flexible bed surface portion and the other bed surface portion in the common plane form a continuous printing surface.

16. The 3D printer of claim 11, wherein the independent movement is in a direction relative to the reference level.

17. The 3D printer of claim 16, wherein the direction is perpendicular to the reference level.

18. The 3D printer of claim 11, wherein the bed surface comprises a stepped surface when another bed surface portion of the bed surface portions is positioned higher or lower than the flexible bed surface portion.

19. A method for 3D printing comprising:
providing a bed surface comprising bed surface portions, wherein each of the bed surface portions is supported for independent movement, wherein, when each of the bed surface portions is positioned at a reference level, the bed surface portions form different parts of a common plane, and wherein a flexible bed surface portion of the bed surface portions is made from a unitary flexible material;
providing linear actuators, wherein each of the linear actuators is connected to at least one of the bed surface portions, respectively, and wherein the linear actuators are configured to generate the independent movement of the bed surface portions and to effect positioning of the bed surface portions, wherein multiple linear actuators of the linear actuators are connected to the flexible bed surface portion;
positioning, via actuation of the multiple linear actuators to different height levels, a first portion of the flexible bed surface portion to be higher than a second portion of the flexible bed surface portion, wherein the flexible bed surface portion is a continuous printing surface between the different height levels and the continuous printing surface comprises a smoothly angled incline; and
depositing material onto the bed surface including the smoothly angled incline to create an object.

20. The method according to claim 19, further comprising:
lowering at least one of the multiple linear actuators to a first height level so that the flexible bed surface portion and another bed surface portion are arranged to tessellate together to form the common plane.

* * * * *